United States Patent [19]

Palm

[11] Patent Number: 5,006,740
[45] Date of Patent: Apr. 9, 1991

[54] INSULATED COOLING BOOT FOR POWER TOOL

[75] Inventor: Bernhard Palm, Brookfield, Wis.

[73] Assignee: Milwaukee Electric Tool Corporation, Brookfield, Wis.

[21] Appl. No.: 537,428

[22] Filed: Jun. 13, 1990

[51] Int. Cl.$^5$ .......................... H02K 7/14; H02K 9/00; H02K 15/14; H02K 7/10

[52] U.S. Cl. .......................... 310/50; 310/43; 310/52; 310/83; 310/89

[58] Field of Search .................. 310/43, 45, 47, 50, 310/52, 83, 89

[56] References Cited

U.S. PATENT DOCUMENTS

| | | | |
|---|---|---|---|
| 2,346,778 | 4/1944 | Mitchell | 310/50 |
| 2,350,631 | 6/1944 | Mitchell | 310/50 |
| 2,373,842 | 4/1945 | Mitchell | 310/50 |
| 2,456,571 | 12/1948 | Turner et al. | 310/50 |
| 3,413,498 | 11/1968 | Bowen, III et al. | 310/47 |
| 3,432,703 | 3/1969 | Sheps et al. | 310/50 |
| 3,476,960 | 11/1969 | Rees | 310/50 |
| 3,491,840 | 1/1970 | Haviland et al. | 310/50 |
| 3,694,680 | 9/1972 | Jacyno | 310/50 |
| 3,903,440 | 9/1975 | Paule et al. | 310/50 |
| 4,513,214 | 4/1985 | Dieringer | 310/89 |

FOREIGN PATENT DOCUMENTS 3000452 7/1981 Fed. Rep. of Germany ........ 310/50

*Primary Examiner*—Steven L. Stephan
*Assistant Examiner*—C. LaBalle
*Attorney, Agent, or Firm*—Bayard H. Michael

[57] ABSTRACT

The in-line saw has a handle, a motor housing and a gear case which contains a drive mechanism which imparts a reciprocating action to the blade. The drive mechanism generates heat. The gear case is covered by an insulating boot which has internal ribs which contact the gear case and form air flow channels. The motor housing has air openings near the handle and the fan mounted on the motor drive shaft draws cooling air through the slots over the motor and out the space between the gear case and the motor housing except that the boot extends partially over the slot to divert air to the space between the boot and the case. The cooling air leaves the cooling space at the front of the boot to blow sawdust from the area of the blade. The boot is electrically insulating and covers the metal gear case.

4 Claims, 2 Drawing Sheets

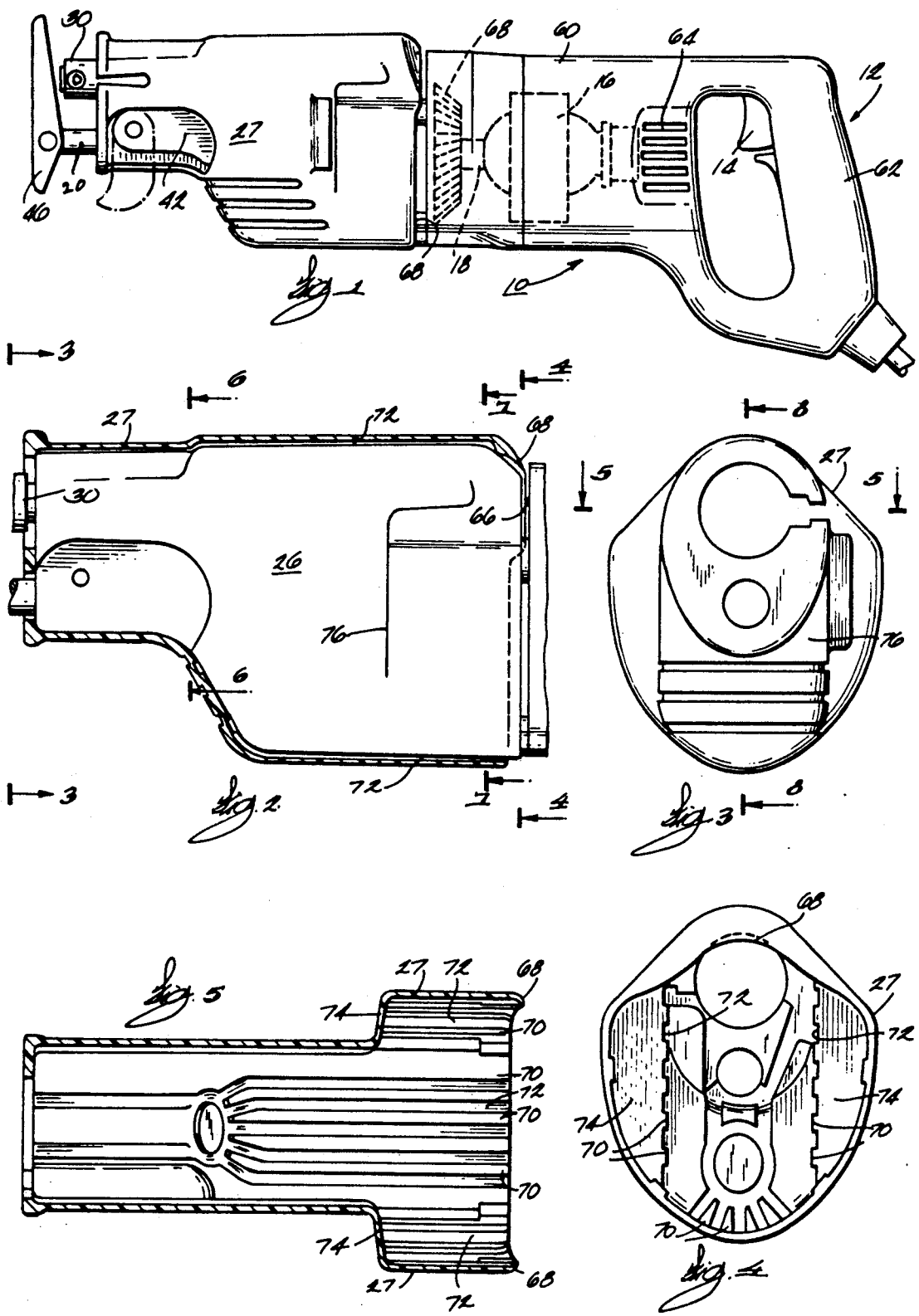

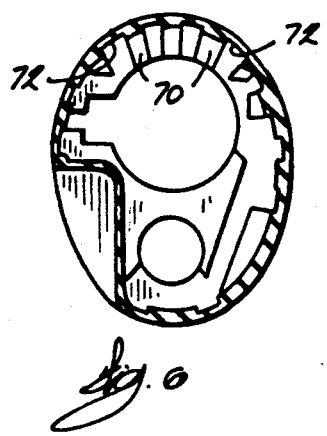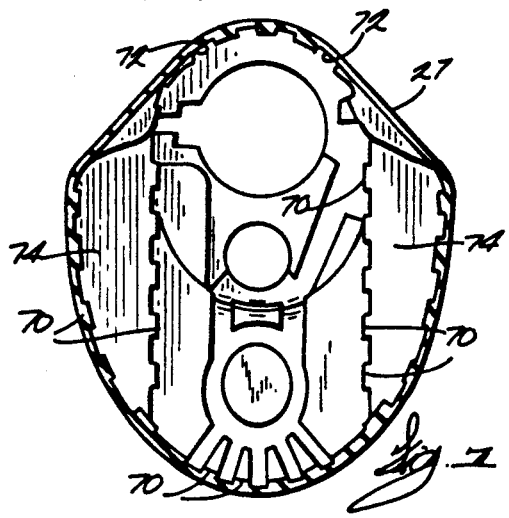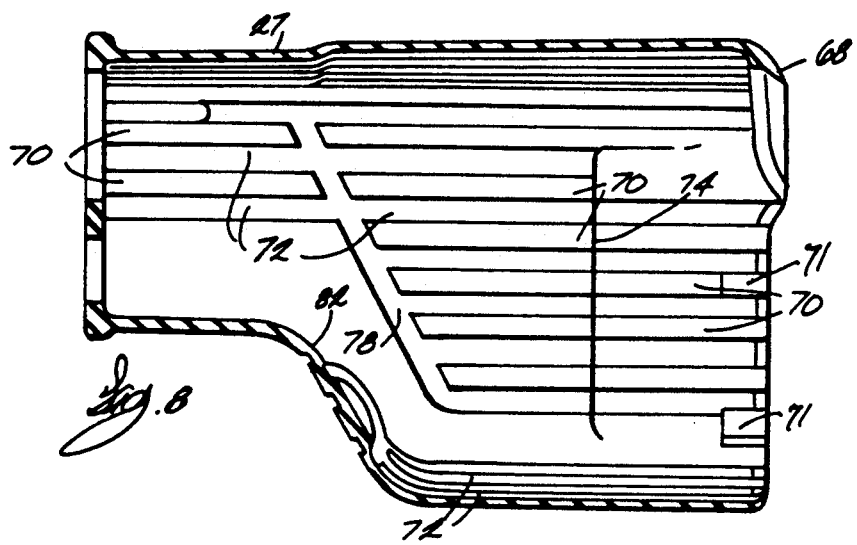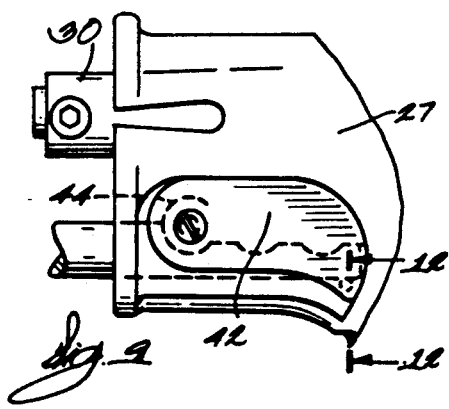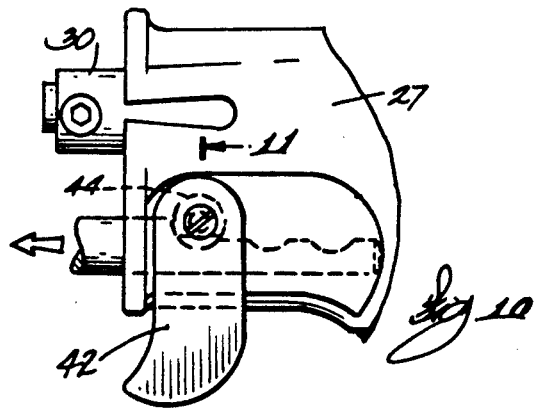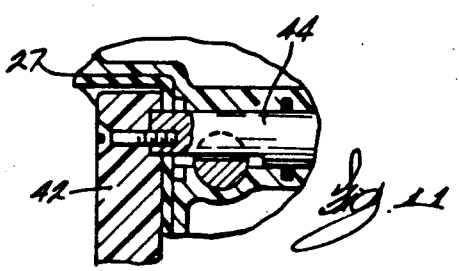

INSULATED COOLING BOOT FOR POWER TOOL

REFERENCE TO COPENDING APPLICATIONS

My application Ser. No. 541093, filed 6/20/90 as a CIP of Ser. No. 187219 filed 3/1/90 shows the details of a double wobble plate drive mechanism referred to herein. My application Ser. No. 537474, filed 6/13/90 shows details of a quick change mechanism for the guide shoe disclosed herein.

BACKGROUND OF THE INVENTION

This invention relates to power tools such as a reciprocating saw. Such mechanisms involve appreciable friction generating heat which must be dissipated. This has not been a great problem with present tools. My copending application Ser. No. 487219 shows a drive mechanism for an in-line saw which employs two wobble plates to impart reciprocating motion to the saw blade and also to a counterweight.

My solution provides a boot fitting over the gear case and providing for flow of cooling air over the case. The boot is electrically insulating to reduce shock hazard to the user (a U.L. requirement). This invention can be used to advantage on many other power tools.

SUMMARY OF THE INVENTION

This invention provides an insulating boot which fits over the gear case of a power tool to electrically insulate the gripping surface and to provide for flow of cooling air between the case and the boot. The inside of the boot has ribs which contact the case to define air channels directing air flow leaving the motor housing of the tool forward along the length of the case to blow sawdust from the region of the saw blade.

The power tool to which this invention is applied has a gear case on the front of and separated from the motor housing. The housing has air inlet slots at the handle end of the housing and a fan is mounted on the motor shaft. There is a space between the housing and the gear case which serves as an air outlet. This invention provides an insulating boot which fits over the gear case and projects partially over the space to deflect some of the exhaust air of the motor into channels formed between the boot and the case by ribs molded on the interior of the boot and contacting the case. The air channels lead forward to exhaust the air around the saw blade to blow sawdust away from the region of the blade.

This invention greatly improves the tool. It electrically insulates the tool to protect the user from shock and provides superior cooling of the gear case which tends to heat up due to the heat generated in the case with the double wobble plate transmission used with the illustrated in-line saw.

BRIEF DESCRIPTION OF THE DRAWINGS

FIG. 1 is a side elevation with some parts shown in dotted lines.

FIG. 2 is an enlarged side elevation of the gear case and a portion of the motor housing and also shows the insulating/cooling boot in section to show its relationship to the case.

FIG. 3 is an elevation of the boot (only) and is taken from the left in FIG. 2.

FIG. 4 is an elevation of the boot viewed from the right in FIG. 2 as indicated by line 4—4.

FIG. 5 is a horizontal section of the boot (only) taken generally as indicated by line 5—5 in FIG. 3.

FIG. 6 is a vertical section through the boot generally along line 6—6 in FIG. 2.

FIG. 7 is a section through the boot on line 7—7 in FIG. 2.

FIG. 8 is a section through the boot on line 8—8 in FIG. 3.

FIG. 9 is a detailed partial elevation showing the nose portion of the tool.

FIG. 10 is similar to FIG. 9 but shows the lever actuated to release the shoe mechanism.

FIG. 11 is a detailed section taken on line 11—11 in FIG. 10.

FIG. 12 is a detailed section on line 12—12 and shows a small protrusion on the lever which engages the flexible boot to provide the resistance to movement holding the lever in its normal position.

DETAILED DESCRIPTION OF THE DRAWINGS

The in-line saw shown in FIG. 1 is broadly similar to the SAWZALL in-line saw manufactured by applicant's assignee but this construction provides for counterbalancing the forces generated by the reciprocating action and results in a far smoother and far superior product. The heat generated by the counterbalancing mechanism necessitates provision for additional cooling of the gear case.

The main body 10 of the saw is provided with a handle portion 12 having an on-off switch 14 which controls energization of motor 16. Motor shaft 18 is provided with drive gear which engages a gear mounted on a jackshaft journaled in the gear case 26. The gear case 26 is covered by a rubber or urethane insulating "boot" 27 which electrically insulates the gear case 26 and provides for cooling air flow between the gear case and boot as described in detail below. The jackshaft has two wobble plate assemblies. The details of the wobble plate drive assembly are shown in my copending application. The drive reciprocates a spindle 30 in which a saw blade is mounted. The drive also reciprocates a counterweight. The combination of the reciprocating spindle and counterweight plus two wobble plates entails appreciable friction and this generates heat which must be dissipated.

The body of the tool is made of a motor housing 60 and a handle 62. The handle portion has air inlet slots 64. The gear case 26 is connected to the motor housing to provide a space or gap 66 therebetween to provide an air outlet. Fan 68 is mounted on the forward portion of the motor shaft 18 to draw air into the rear of the motor enclosure and then forward over the motor 16 to the air outlet gap 66 between the motor housing and the gear case.

The rear edge 68 of the insulating boot 27 is shaped to project over the gap 66 between the gear case and the motor housing to scoop in some of the air leaving the motor housing and direct the air forward between the boot and the gear case. For this purpose, the boot 27 is provided with internal ribs which contact the gear case to define airflow channels 72 to direct cooling air over the gear case to dissipate the heat generated by the mechanism. Thus, in the rear portion of the boot there is a set of ribs 70 leading forward to the area of the shoulder 74 which lies forward of the gear case shoulder 76, thus providing a manifold space behind the ribs leading forward from the manifold space. The ribs in the lower portion lead toward the boot portion which slopes upwardly and forwardly and conforms to the gear case. These ribs lead to the sloping channel 78 which functions as a manifold assuring airflow between the ribs. Additional ribs are provided in the smaller portion of the boot. The upper ribs in this group engage the gear case and project beyond the gear case to provide an outlet from which air flows at substantial velocity to blow sawdust from the area of the cut.

The gear case 26 is made of metal for strength and heat conduction while the motor housing and handle are made of plastic which, among other things, is electrically insulating. Safety considerations require the forward portion of the saw to be insulated to reduce the chance of shock if the user cuts through live electrical wiring. The boot 27 is electrically insulating and, in addition, functions as a cooling jacket directing airflow over the gear case to dissipate the heat generated by the drive mechanism. The amount of air scooped up is determined by the extent the rear edge of the boot 27 extends over the gap between the gear case and the motor housing.

It will be noted the rear edge of the boot curls down somewhat to engage and grip the front edge of the motor housing to scoop air from the upper portion of gap 66. Lugs 71 on the inside rear portion of the boot grip corresponding recesses in the gear case 26 to retain the boot on the gear case. Lever 42 on the front of the gear case is secured to shaft 44 which projects from the gear case 26 and through the boot 27, thus engaging the boot and functioning to retain the boot in its assembled position.

The lever 42 is used in connection with the quick release mechanism for shoe post 20, the details of which are of no interest with respect to this invention and which are disclosed in detail and claimed in my copending application mentioned above.

I claim:

1. A hand power tool including motor housing having a handle at one end and a gear case at the other end,
a transmission in said gear case, said transmission tending to build up heat,
a motor in said housing and having a shaft driving said transmission,
a fan in said housing driven by said motor,
air entry slots in said housing and an air exhaust space between said gear case and said housing so said fan can draw air into said housing through said slots and exhaust it through said space,
an insulating boot fitting over said gear case and projecting partially over said space between the gear case and the housing to divert cooling air flow between said boot and said gear case,
and spaced parallel ribs on the interior of said boot running lengthwise of said boot to channel cooling air flow forward between said boot and said gear case,
said cooling air leaving the space between said boot and said gear case adjacent the front of said power tool to blow on the working area of the tool to remove debris from the working area.

2. A power tool according to claim 1 in which the ribs which extend to the rear of the boot lead forward to a manifold area receiving air from a plurality of said channels,
and a plurality of ribs leading forward from said manifold area to define cooling channels in cooperation with said gear case.

3. A tool according to claim 1 including,
an operating lever journaled in the front portion of said gear case and having a shaft projecting laterally from said gear case,
said boot being apertured to receive said shaft when said boot is mounted on said gear case whereby said shaft serves to retain said boot in its assembled position.

4. A tool according to claim 3 in which the portion of said boot which projects into said space between said gear case and said housing curves into said space and engages said gear case adjacent said slot to cause said boot to grip said gear case.

* * * * *